United States Patent
Herman-Saffar et al.

(10) Patent No.: US 11,836,251 B2
(45) Date of Patent: Dec. 5, 2023

(54) MALWARE DETECTION USING A MACHINE LEARNING MODEL

(71) Applicant: Dell Products L.P., Round Rock, TX (US)

(72) Inventors: Or Herman-Saffar, Ofakim (IL); Yevgeni Gehtman, Modi'in (IL); Amihai Savir, Sansana (IL)

(73) Assignee: Dell Products L.P., Round Rock, TX (US)

( * ) Notice: Subject to any disclaimer, the term of this patent is extended or adjusted under 35 U.S.C. 154(b) by 623 days.

(21) Appl. No.: 16/817,274

(22) Filed: Mar. 12, 2020

(65) Prior Publication Data
US 2021/0286875 A1   Sep. 16, 2021

(51) Int. Cl.
*G06F 21/56* (2013.01)
*G06N 20/00* (2019.01)

(52) U.S. Cl.
CPC ............. *G06F 21/56* (2013.01); *G06N 20/00* (2019.01)

(58) Field of Classification Search
CPC .......... G06F 21/56; H04L 63/14; H04L 63/20
See application file for complete search history.

(56) References Cited

U.S. PATENT DOCUMENTS

| | | | |
|---|---|---|---|
| 10,089,467 B1* | 10/2018 | Hartnett | G06N 20/00 |
| 2017/0063888 A1* | 3/2017 | Muddu | H04L 63/1433 |
| 2021/0182388 A1* | 6/2021 | Myneni | G06N 20/00 |
| 2021/0194900 A1* | 6/2021 | Schmidtler | H04L 67/06 |

* cited by examiner

*Primary Examiner* — Olugbenga O Idowu
(74) *Attorney, Agent, or Firm* — Norton Rose Fulbright US LLP (57) ABSTRACT

An information handling system may receive a plurality of rules and a file for malware testing. The information handling system may apply two or more of the plurality of rules to the received file to determine a plurality of outcomes of application of the rules to the file. The information handling system may determine whether to classify the received file as malware or not malware by applying a machine learning model to the plurality of outcomes.

16 Claims, 6 Drawing Sheets

MALWARE DETECTION USING A MACHINE LEARNING MODEL

FIELD OF THE DISCLOSURE

The present disclosure generally relates to information handling systems, and more particularly relates to malware detection in information handling systems.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

As information handling systems have become more pervasive, information security has become increasingly important. Malware containing malicious code to steal user information, or render information handling systems or other electronic devices inoperable, has become increasingly sophisticated and pervasive. To combat the increasing prevalence and sophistication of malware, methods have been developed to detect whether data on an information handling system, such as files stored on an information handling system, contains malicious code. Some methods involve examining files to determine if files include characteristics, such as binary strings, that are indicative of malware. For example, libraries of rules describing aspects of file that may indicate that the files are malware are assembled. An information handling system may apply the rules to files on the system to detect malicious files.

As the sophistication and prevalence of malware have increased, a burgeoning number of rules for detecting different varieties of malware has increased the cost, and decreased the effectiveness, of malware detection systems. For example, an information handling system may routinely scan all files stored on the information handling system, applying each rule to each file, to determine which files may contain malware. The application of each rule to each file to detect potential malware can consume substantial time and resources. Further, the increasing number of rules also creates increasing opportunity for false positives, flagging files that are not malicious as including malware. False positives can cause system administrators to be less vigilant in reviewing lists of files detected during application of the rules and indicated as potentially malicious. The presence of false positives can also increase the amount of time required for system administrators and/or cyber-security experts to examine the flagged files, increasing the cost of system maintenance. Thus, current systems for detecting malware leave much to be desired.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

Artificial intelligence and machine learning can be leveraged to reduce false positives and increase efficiency in malware detection methods. Instead of applying all rules to all files, an information handling system may apply a subset of rules to each file that are deemed likely to detect malware in the file, if the malware is present. For example, rules that are not effective to detect malware present in document files may be passed over when analyzing document files. Selective rule application can enhance efficiency in malware detection by applying only a subset of available rules to each file, reducing the amount of time and processing power required for malware detection. Furthermore, the outcomes of all rules applied to a file, such as determinations, based on each rule, whether the file should be flagged as malware or not, may be fed into a machine learning model to determine whether a specific combination of outcomes indicates that the file is likely malware. Application of a machine learning model to outcomes of applications of multiple rules to determine whether the file is likely malware can reduce false positives by providing a recommendation based on multiple rule applications rather than simply flagging all files that are determined to be potential malware by any one of the rules. Thus, a machine learning model can be used, along with selective rule application, to enhance efficiency and accuracy in malware detection.

An information handling system may perform a method to detect and flag potential malware. A method for detecting malware in an information handling system may begin with receiving, by the information handling system, a plurality of rules. The rules, for example, may include binary strings or other file features that are associated with previously discovered malware. Individual rules may include features of families of malware specifying file features that are typical of certain families of malware. For example, each rule may include a set of strings and/or a Boolean logical expression detailing a textual or binary pattern that is associated with previously known malware. In some embodiments, the set of rules received may include tens of thousands of rules, or more. The set of rules may be stored in a memory of the information handling system and may be periodically updated. In some embodiments, the information handling system may receive the set of rules from a rule server or database.

An information handling system may also receive a file for malware testing. In some embodiments, files may be tested as they are transferred to the information handling system. In other embodiments, receiving a file for malware testing may include accessing a file in a data storage, such as a hard disk or solid state drive (SSD) of the information handling system, during a periodic or manual scan of some or all files stored on the information handling system.

Received files may, for example, include pdf files, document files, text files, video files, image files, graphics files, executable files, and other files.

An information handling system may apply two or more rules of the plurality of rules to the received file to determine a plurality of outcomes. For example, the information handling system may apply a first rule searching for a first text or binary string in the received file and may apply a second rule searching for a second text or binary string in the received file. An outcome may be determined based on each rule application. For example, if a binary string indicated by the first rule is detected in the file, the outcome for the application of the first rule to the file may flag the file as potential malware. Likewise, if a text string indicated by the second rule is not detected in the file, the outcome for the application of the second rule to the file may flag the file as not potential malware. In some embodiments, the information handling system may apply more than one but fewer than all of the received rules to a file to be tested. For example, a subset of received rules to be applied to the file may be selected by the information handling system. The subset of rules may be selected based, at least in part, on characteristics of the file, such as a file type, extension, creation date, or other file characteristic. For example, certain rules may be selected to apply to a document file, such as a pdf file, while other rules may be selected to apply to a video file. Rules may be selected to apply to a file of a specific type that are more likely to detect malware in files of that type. For example, if a rule searches for a specific string that is only present in pdf files, the rule may be applied to pdf files but not applied to other types of files. In some embodiments, historical rule application data may be examined to determine which rules to apply to a file. For example, rules that have never resulted in an indication that files having the same file type as the file being examined are malware files may be less likely to detect that the file being examined is a malware file. In some embodiments, the information handling system may determine which rules to apply to a file based on a probability that the rules will detect a malware string, if present, in that type of file. For example, if a probability that a rule will detect malware in a file, if present, is greater than a threshold probability, the rule may be applied to the file. In some embodiments, a Bayesian model may be applied to determine the probability that the rule would be able to detect malware in the file. The Bayesian model may determine the probability based, at least in part, on characteristics of each rule, such as a rule name and category, and characteristics of the file, such as a file type. Although Bayesian models are described, and classification model may be used, including, for example, a SVN model, a linear specification model, a logistic regression model, or a combination thereof.

A determination of whether to classify the file as malware or not malware may be made based on the outcomes of application of the two or more rules. For example, a machine learning model may be applied to the plurality of outcomes and, in some embodiments, the rules or characteristics of the rules, to determine whether the file should be classified as malware or not malware. The machine learning model may, for example, examine past data regarding whether combinations of specific outcomes of specific rules correctly indicated that a file was malware or not malware and may determine whether the file should be classified as malware or not malware based on the past data. For example, certain combinations of rules and outcomes may have correctly indicated that a file was malware while other combinations of rules and outcomes may have included false positives. If the combination of rules and outcomes for the file has, in the past, correctly indicated that files contain malware, the file may be classified as malware. If the combination of rules and outcomes has, in the past, frequently or always been incorrect in indicating that files contain malware, the file may be classified as not malware.

The information handling system may alert a user, such as a system administrator or cyber-security expert, when a file is classified as malware. For example, the information handling system may add the file to a list of files flagged as malware so that a user may, at a later time, examine and remove the file if necessary. In some embodiments, the information handling system may quarantine files classified as malware to prevent the malware from causing damage to the system or accessing private information.

The back end information handling system may train and maintain a machine learning model applied by a client information handling system to classify files. For example, a back end information handling system may receive, from a client information handling system one or more rules applied to a file, such as by receiving information specifying one or more rules applied to a file, a plurality of outcomes of the application of the one or more rules to the file, and a classification of the file as malware or not malware made using a machine learning model to analyze the plurality of outcomes. In some embodiments, the back end information handling system may also receive one or more file characteristics, such as file type, extension, name, length, and other file characteristics, for the file. The back end information handling system may also receive classification verification information specifying whether the classification of the file as malware or not malware was correct. For example, a user, such as a system administrator or cybersecurity expert, may analyze files classified as malware do indeed contain malware. If the files do contain malware, the user may verify that the classification was correct and the verification may be transmitted to the back end information handling system. In some embodiments, the back end information handling system may receive information from multiple client information handling systems regarding analysis of multiple files. The back end information handling system may store the received information in a database.

The back end information handling system may train the machine learning model applied by the client information handling system using the received rule information, outcomes, and classification of the file. In some embodiments, the machine learning model may also be trained based on the received file characteristics and classification verification. For example, a copy of the machine learning model residing on and applied by the client information handling system may be stored on the back end information handling system and may be trained using the received information. For example, the back end information handling system may train the model to recognize correlations between specific combinations of rule outcomes and whether those combinations indicated a file that was correctly, or incorrectly, classified as malware. As one example, the back end information handling system may train the model to increase the probability that a new file will be classified as malware if a set of rules applied and outcomes of the new file are the same as or similar to a set of rules applied and outcomes of application of the rules to a similar file that was correctly classified as malware. As another example, the back end information handling system may train the model to decrease the probability that a new file will be classified as malware if a set of rules applied and outcomes of the new file are the same as or similar to a set of rules applied and outcomes of application of the rules to a similar file that was incorrectly classified as malware.

After the model is trained, the back end information handling system may generate an update to the model. The update may then be transmitted to the client information handling system and may be applied to update the machine learning model applied by the client information handling system. In some embodiments, updates to the machine learning model may be pushed to a network of client information handling systems. Thus, a back end information handling system may train a machine learning model applied by one or more client information handling systems.

An information handling system may include a memory and a processor for performing the steps described herein. Instructions for performing the steps described herein may be stored on a non-transitory computer readable medium.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications and with several different types of architectures, such as distributed computing architectures, client/server architectures, or middleware server architectures and associated resources.

Figure 1:
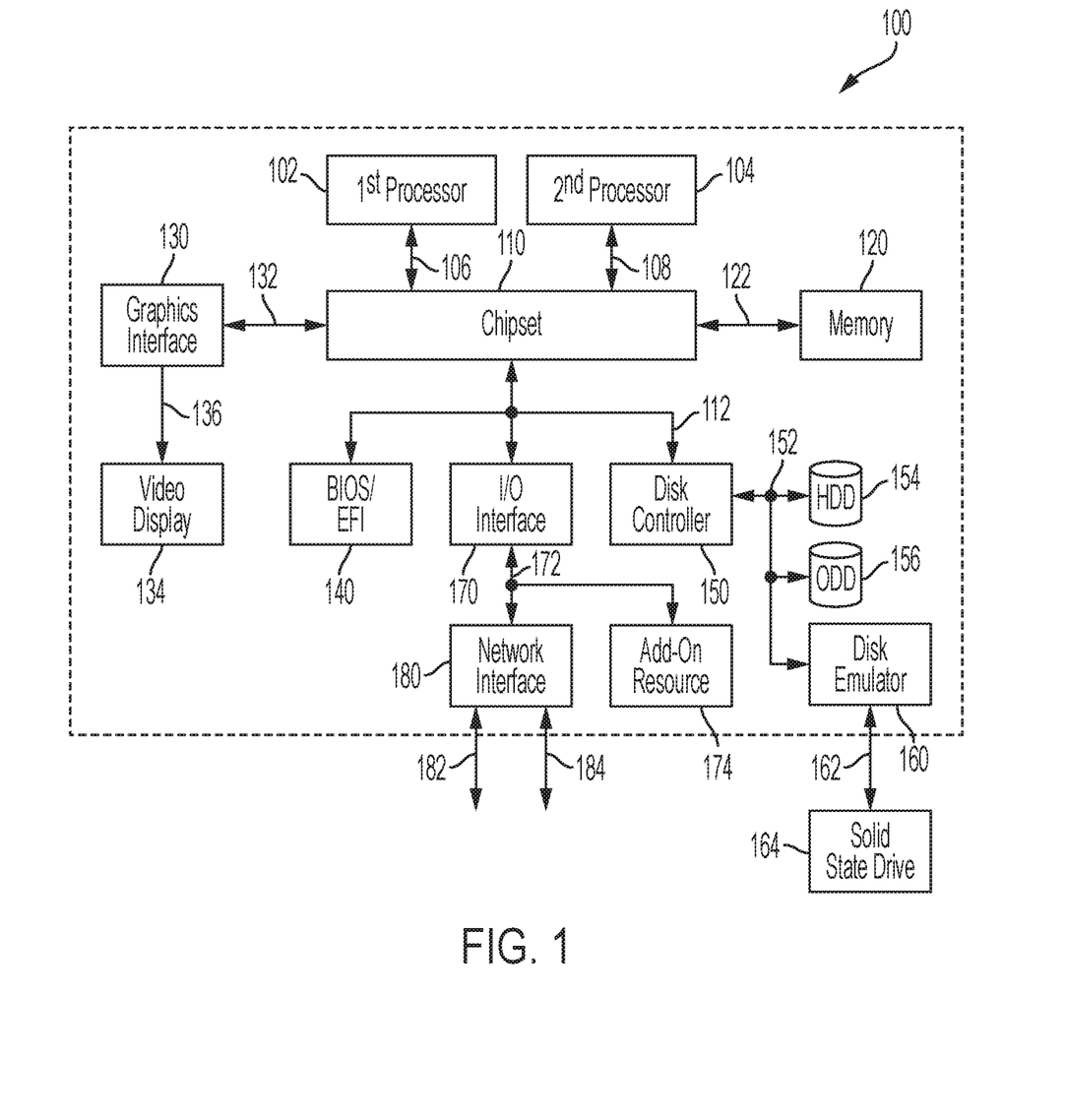
FIG. 1 is a block diagram of an information handling system, according to at least one embodiment of the present disclosure.

FIG. 1 illustrates a generalized embodiment of an information handling system 100. For purpose of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input/output (I/O) devices, such as a keyboard, a mouse, and a video display. Information handling system 100 can also include one or more buses operable to transmit information between the various hardware components.

Information handling system 100 includes processors 102 and 104, a chipset 110, a memory 120, a graphics interface 130, include a basic input and output system/extensible firmware interface (BIOS/EFI) module 140, a disk controller 150, a disk emulator 160, an I/O interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132 and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read-only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, an SCSI interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, an SCSI interface, a USB interface, a proprietary interface, or a combination thereof. Disk emulator 160 permits a solid-state drive 164 to be connected to information handling system 100 via an external interface 162. An example of external interface 162 includes a universal serial bus (USB) interface, an Institute of Electrical and Electronics Engineers (IEEE) 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface 180 includes network channels 182 and 184 that provide interfaces to devices that are external to information handling system 100. In a particular embodiment, network channels 182 and 184 are of a different type than peripheral interface 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
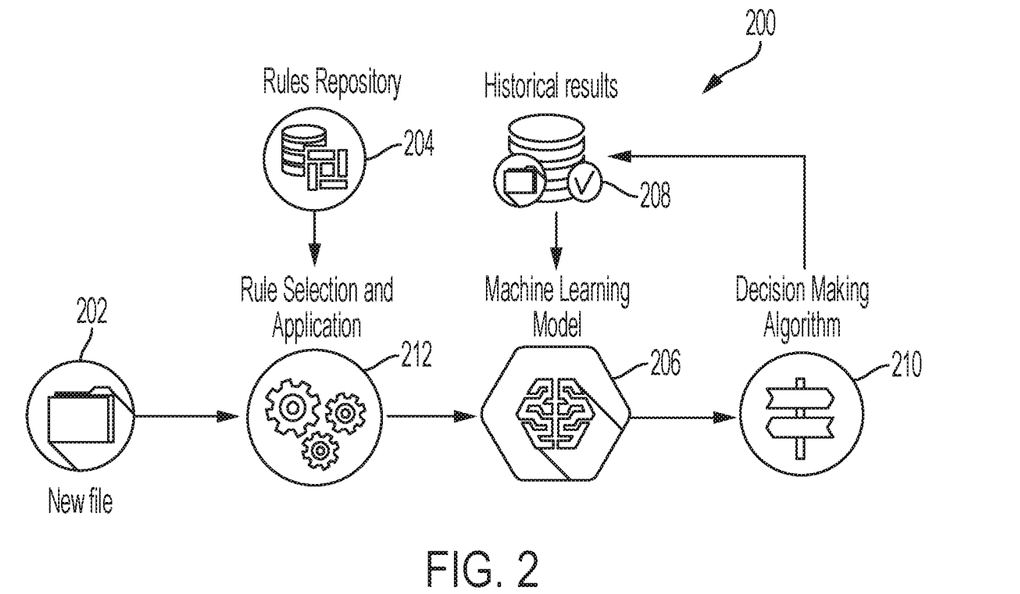
FIG. 2 is a diagram of an example system for malware detection according to at least one embodiment of the present disclosure.

Files may be analyzed by an information handling system to determine if they contain, or are likely to contain, malware. For example, files may be analyzed according to rules specifying specific binary or text strings that have been determined to be characteristic of known malware or families of malware to determine if the files contain the strings specified by the rules. An example system 200 for applying rules to files to determine if the files should be classified as malware is shown in FIG. 2. A new file 202 may be received by an information handling system. For example, the new file 202 may be received from another information handling system, may be received from a database or server, or may be retrieved from an internal memory of an information handling system, such as from a hard disk or SSD of the information handling system.

The file may be input into a rule selection and application module 212 for selecting one or more rules to be applied to the file 202 and for applying the selected rules. For example, the rule selection and application module 212 may select one or more rules from a rules repository 204 to apply to the file 202. The rules repository 204 may be stored locally on the information handling system or stored remotely, such as on a rule server. For example, the rules repository 204 may be continuously updated with new rules specifying text or binary strings that may indicate that files include malware, as new malware families are discovered and characterized. The rules in the rules repository 204 may, for example, include text or binary strings that are characteristic of entire families or classes of malware. The rules repository 204 may, for example, include rules for one or more malware detection engines, such as a YARA engine or a Vscan engine. For example, the rules may include sets of strings and/or Boolean expressions that determine rule logic. A rule may include multiple text or binary strings that are associated with a specific malware or malware family or strain. The rule may also include binary specifying relationships of the strings. For example, if some specified strings are present and others are not, the binary may specify whether files with a specific combination of strings present include malware. In some embodiments the rules may be obtained from a public database or from multiple public databases. An example rule is shown below:

rule silent_banker: banker
    meta:
    description="This is an example"
    thread_level=3
    in_the_wild=true
    strings:
      $a={6A 40 68 00 30 00 00 6A 14 8D 91}
      $b={8D 4D B0 2B C1 83 C0 27 99 6A 4E 59 F7 F9}
      $c="UVODFRYSIHLNWPEJXQZAKCB GMT"
    condition:
      $a or $b or $c The above example rule is of a banker type with a thread level of three. The malware the rule is created to detect is specified as being currently in circulation or "in the wild." The example rule above specifies two hexadecimal strings to search for and a text string to search for. The binary condition specifies that if either of the hexadecimal strings or the text string is present in a file, the file may be classified as possible malware. A rule repository may have thousands, or even tens or hundreds of thousands, of such rules. In some embodiments rules may incorporate wild-cards, may incorporate regular expressions, and/or may incorporate special operators. Text strings specified by rules may be case sensitive.

Rules may be selected from the rules repository 204 by the rule selection and application module 212 for application to the file 202. For example, the rule selection and application module 212 may select two or more rules from the rules repository 204 to apply to the file 202. Fewer rules than all the rules present in the rules repository 204 may be selected for application. For example, the rule selection and application module 212 may select rules from the rules repository 204 based on characteristics of the file 202, such as contained in file metadata, which may include a file type, extension, and other file characteristics, and/or the rules, such as a rule name, class, and history. For example, if the file 202 is an image file, the rule selection and application module 212 may select only rules from the rules repository 204 that are effective at detecting malware in image files. Rules with a specific rule type, name, or classification that is associated with malware that may be included in image files may be selected. In some embodiments, the rule selection module may select rules based on a history of effectiveness of specific rules at detecting malware in files that share characteristics with the file 202, such as a file type. For example, rules that, in the past, have proved effective at detecting malware in files that share one or more characteristics with the file 202 may be selected to apply to the file 202, while rules that have proved ineffective in the past may be passed over. In some embodiments, rules may be selected by the rule selection and application module 212 based on a probability that the rule would detect malware in the file if the file was malicious. The probabilities may, for example, be determined using a Bayesian model.

The rule selection and application module 212 may apply the selected rules to the file 202 to generate a plurality of outcomes. For example, the rule selection module may determine whether each rule applied to the file indicates that the file is malware or not malware. For example, if a specific binary string specified by a specific rule is detected in the file 202, the rule selection and application module 212 may generate an outcome for the rule indicating that the file 202 may be malicious. After the selected rules have been applied, the rule selection and application module 212 may pass the rules and their associated outcomes, and, in some embodiments, file information, to a machine learning model 206.

The machine learning model 206 may, for example, include a support-vector machine, a linear specification model, a logistic regression, or another classification model. The machine learning model 206 may receive the applied rules, the determined outcomes, and, in some cases, the file information, from the rule selection module 210 and may, along with the decision making algorithm 210 determine whether to classify the file 202 as malware or not malware. In some embodiments, the machine learning model may also receive an input of the amount of time it took to apply the rules to the file, such as an engine scanning duration. In some embodiments, the machine learning model may be executed by the decision making algorithm 210. The machine learning model 206 may determine a probability, given the rules, outcomes, and/or file information, that the file contains malware. If the probability is greater than a probability threshold, the decision making algorithm 210 may classify the file as malware. The machine learning model 206 may leverage past results, where combinations of rules and outcomes were associated with files that were or were not malware to determine whether to classify the file as malware or not malware. For example, if a specific combination of rules and outcomes is frequently associated with files confirmed to be malware, the machine learning model 206 may classify the file as malware. In some embodiments, if the file is classified as malware the decision-making algorithm 210 may also quarantine the file and/or notify a user, such as a system administrator, that a file has been classified as malware.

The decision making algorithm 210 may also pass the rules, outcomes, file information, and the determination of whether the file is classified as malware or not malware to a historical results database 208. In some embodiments, a determination by an analyst, such as a system administrator, of whether the file 202 actually was malware may be passed to the historical results database 208 as well. The historical results database 208 may be used to train the machine learning model 206 to improve accuracy of determinations of whether to classify files as malware or not malware and to reduce false positives. Thus, a system 200 may apply multiple rules to a file and may analyze the outcomes of those rules using a machine learning model 206 to determine whether to classify a file as malware or not malware.

Figure 3:
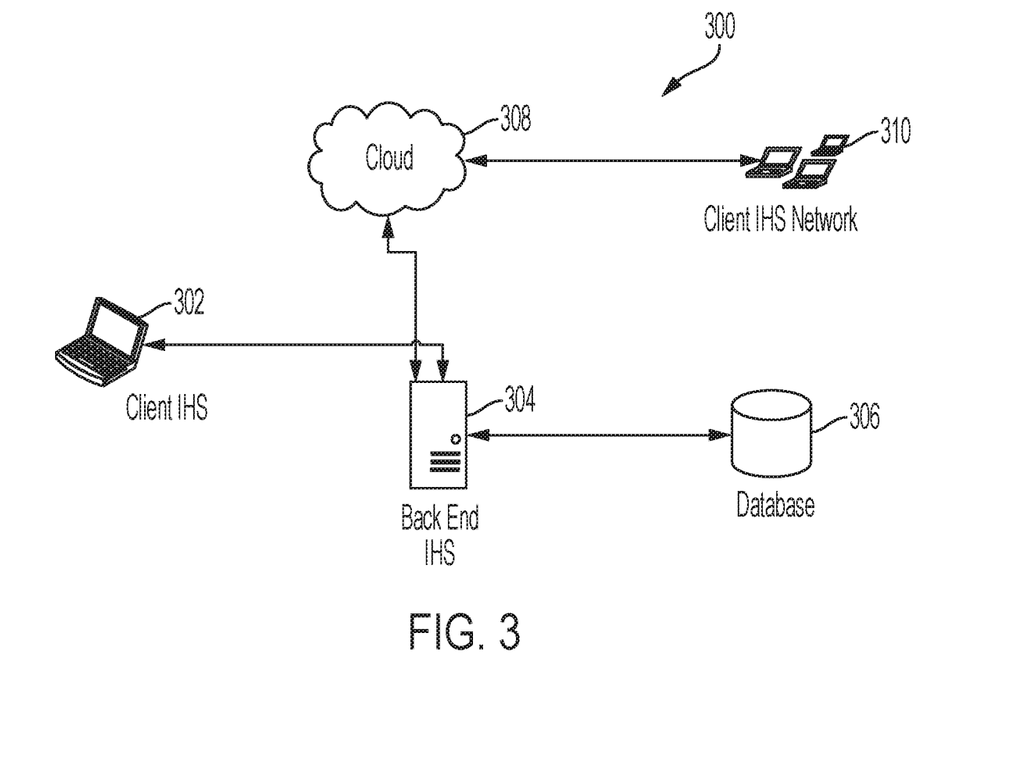
FIG. 3 is a diagram of an example network of information handling systems for malware detection according to at least one embodiment of the present disclosure.

A back-end information handling system may train and maintain a machine learning model to be applied by client information handling systems when scanning for malware. An example network 300 of information handling systems is shown in FIG. 3. A client information handling system (IHS) 302 may implement a system for applying rules to files to determine if the files are malware as described with respect to FIG. 2. The client IHS 302 may apply rules to local files, or files received from a back end information handling system 304 or the cloud 308, to determine if the files should be classified as malware or not malware. In some embodiments, the client IHS 302 may receive rules directly from a database 306, such as a rules database or via a back end information handling system 304. The client IHS 302 may determine two or more rules to apply to each file based on characteristics of the rules and the file. The client IHS 302 may apply a machine learning model to determine if the files, based on the outcome of the application of multiple rules, should be classified as malware or not malware. The client IHS 302 may transmit the final classification of a file, data about the file such as metadata and a file type, and the rules applied to the file to a back end information handling system 304. The client IHS 302 may also transmit a determination by a user, such as a system administrator, of whether the file classified as malware was, in fact, malware.

The back end information handling system 304 may use the data received from the client IHS 302 to train the machine learning model. For example, the machine learning model may be trained to recognize that certain combinations of rules applied to a file, outcomes of the rules applied to the file, and file characteristics indicate that a file is likely malware, while other combinations produce false positives, leading to a classification of a file as malware when the file was not malware. The machine learning model may be trained to classify as malware files with combinations of rules applied, outcomes of rules applied, and file characteristics that in the past have correctly indicated that a file was malware. In some embodiments, the back end information handling system 304 may receive rule application data, rule outcome data, and file characteristic data from a network 310 of client information handling systems via the cloud. The back end information handling system 304 may update the machine learning model based on the training and may push the update to the client IHS 302 and the network of client information handling systems 310. In some embodiments, the back end IHS 304 may store the received rule, outcome, and file data in a database 306.

Figure 4:
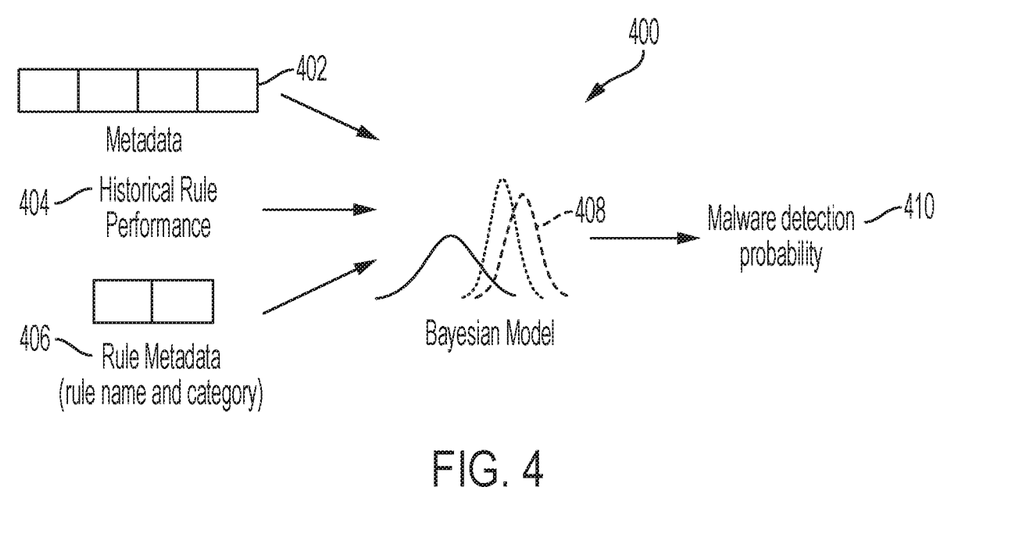
FIG. 4 is a diagram of an example system for selecting rules based on a Bayesian model according to some embodiments of the disclosure.

In determining what rules to apply, the rule selection module 212 of FIG. 2 may apply a Bayesian model to select rules to apply to the file 202. An example Bayesian model selection module 400 is shown in FIG. 4. For example, a Bayesian model may be used to select two or more rules that have the greatest probability of determining whether a file with specific file characteristics includes malware, if present. In some embodiments, a probability threshold may be set, such that if a rule has greater than a predetermined probability of detecting malware in a file with specific file characteristics, if present, the rule will be applied to the file. Inputs to a Bayesian model 408 may include metadata 402 for a file, historical performance data 404 of a rule, and metadata 406 for a rule. The file metadata 402 may include a file type, such as a text file, spreadsheet file, image file, video file, graphics file, executable file, or other file type, name of the file, size of the file, extension of the file, author of the file, number of modifications to the file, and creation time of the file. Rule metadata 406 may include data for the rule for which a determination is being made of whether to apply the rule to the file, such as a name of the rule, a categorization of the rule, a family of the rule, and other rule metadata. Historical rule performance data 404 may include past performance of the rule under examination. The historical rule performance data 404 may include data of past performance of the rule, such as application of the rule to files of various types, determinations that were made upon application of the rule as to whether the file should be classified as malware or not malware, and whether those determinations were correct or false flags. The Bayesian model 408 may use the input file metadata 402, historical rule performance data 404, and rule metadata 406 to determine a probability 410 that the rule will detect malware in the file, if present. For example, the rule selection module 202 of FIG. 2 may apply the Bayesian model 408 to examine past instances in which the rule under examination has been applied to files having similar metadata, such as files of the same file type. If the rule has, in the past, correctly flagged files of the same type as the file being examined as including malware, the determined probability 410 may be high. If the probability 410 is high and/or meets or exceeds a predetermined probability threshold, rule selection module 212 of FIG. 2 may select the rule for application to the file 202. If, however, the rule has, in the past, repeatedly flagged files of the same type as the file under examination as including malware when the files did not include malware, or if the rule has never detected malware in a file of the same type as the file under examination, the probability 410 output from the Bayesian model 408 may be low. If the probability 410 is low and/or falls below a predetermined probability threshold, the rule selection module 212 of FIG. 2 may not select the rule under examination for application to the file 202. In some embodiments, certain rules, for example rules having certain rule classifications, may never be applied to certain file types. In some embodiments, the rule name and category may be used to determine a rule content and/or purpose and may be considered, by the Bayesian model 408, in determining the probability 410. Thus, a Bayesian model 408 may be used to select the most relevant rules for application to a file to determine whether the file includes malware. The use of a Bayesian model 408 can reduce malware detection time and free computing resources for other tasks by applying only a subset of rules to a given file for malware detection.

Figure 5:
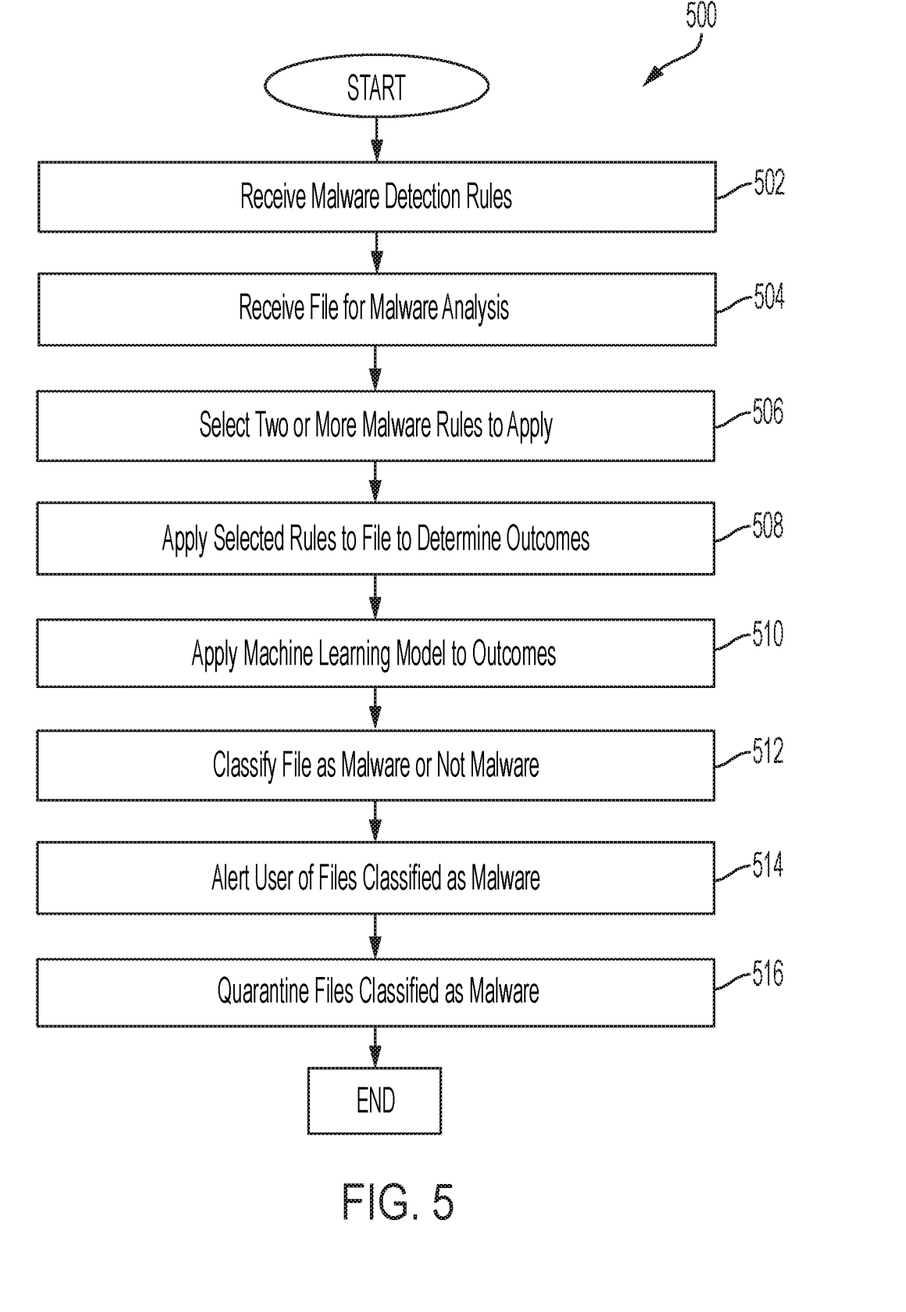
FIG. 5 is a block diagram of an example method for malware detection according to at least one embodiment of the present disclosure.

An information handling system may selectively apply malware detection rules to a file and may determine whether to classify the file as malware or not malware based on the outcomes of the selective rule application. An example method 500 for classifying a file as malware or not malware may begin, at step 502, with receipt of a plurality of malware detection rules. For example, an information handling system may receive multiple rules specifying file features, such as file bit or text strings, that indicate that a file may include malware and may store those rules internally. The rules may be rules from a malware detection engine, such as YARA rules or VScan rules. In some embodiments, the information handling system may receive rules from a rule server.

At step 504, the information handling system may receive a file for malware analysis. For example, an information handling system may perform malware analysis on files as they are received by the information handling system from other information handling systems. Alternatively or additionally, the information handling system may access files stored in an internal memory, such as a hard disk or SSD, of the information handling system and may scan the files for malware. For example, an information handling system may perform periodic scans of all files of an information handling system for malware. In one example embodiment, a file may be fetched into a queue of files to be scanned from an application programming interface (API) or an external storage.

At step 506, the information handling system may select two or more malware rules to apply to the file. For example, the received file may be moved to a rule selection module which may determine characteristics of the file and may select one or more rules based on the characteristics of the file. For example, the information handling system may select malware rules that are likely to detect malware, if present, in the file. In some embodiments, the information handling system may select rules to apply to a file based on a probability that each rule will detect malware in the file, if present. For example, if a probability that a rule will detect malware in the file, if present, meets or exceeds a predetermined threshold, the information handling system may select the rule for application to the file. If a probability that a rule will detect malware in the file, if present, is below a predetermined threshold, the information handling system may pass over the rule and select other rules for application to the file. In some embodiments, the information handling system may apply a Bayesian model to determine a probability that a rule will find malware, if present, in a file. For example, the information handling system may input characteristics of the file found in file metadata, such as a file name, type, extension, size, author, number of modifications, creation time, and other file metadata, metadata of a rule being analyzed to determine whether the rule should be applied to the file, and historical rule performance data for the rule being analyzed into a Bayesian model. The Bayesian model may then be used to determine a probability that the rule will find malware in the file, based on the file metadata, rule metadata, and historical rule performance data. The determined probability may be used to determine whether to select the rule for application to the file. In some embodiments, multiple rules from multiple malware detection engines, such as YARA and Vscan, may be selected and applied.

At step 508, the information handling system may apply the selected rules to the file. Application of the selected rules to the file may generate multiple outcomes, with each outcome indicating whether application of a specific rule indicates that the file contains malware or does not contain malware. For example, a first rule may be applied to the file searching the file to determine if one of three text strings is present in the file. When one of the text strings is found, the outcome of application of the rule may indicate that the file contains malware. A second rule may be applied to the file searching the file to determine if a certain bit string is present in the file. When the bit string is not found, the outcome of the application of the second rule may indicate that the file does not contain malware. Application of selected rules, as opposed to brute force application of all available rules, may reduce the amount of system resources and time required to examine files for malware while maintaining efficacy of malware detection systems.

At step 510 a machine learning model may be applied to the outcomes to determine if the file should be classified as malware or not malware. For example, the outcomes of application of multiple rules, the rules applied to the file, and file metadata, such as a file type, may be fed to a machine learning algorithm. In some embodiments, the machine learning model may also receive an amount of time it took to apply the selected rules to the file, as an input. The machine learning algorithm may determine based on the rules applied, the outcomes of the rules applied, the amount of time it took to apply the selected rules to the file, and/or the file metadata whether the file should be classified as malware or not malware. For example, if the combination of rules applied and outcomes has, in the past, resulted in correct classification of files similar to the present file as malware, the machine learning model may classify the file as malware. If, however, the combination of rules applied and outcomes has resulted in false flag malware classification of files similar to the present file, the machine learning model may classify the file as not malware, even if one or more of the outcomes indicated that the file should be classified as malware. The machine learning model may, for example, be a model trained using file classifications based on rules and expert analysis determining whether the files were correctly classified based on the rules. The trained machine learning model may help to reduce the number of files incorrectly flagged as malware, reducing the amount of time required for users, such as system administrators or cyber-security experts, to examine the flagged files and enhancing user confidence in file classifications. In some embodiments, the machine learning model may consider multiple outcomes of multiple rules from multiple engines applied to the file in determining the ultimate file classification.

At step 512, the file may be classified as malware or not malware. For example, the machine learning model, or a decision module receiving the output of the machine learning model, may classify the file as malware or not malware based on the analysis of the rules applied, the outcomes of the application of the rules, and the file characteristics. In some embodiments, the machine learning model may output a probability that a file contains malware or does not contain malware. A determination of whether the file should be classified as malware or not malware may be made base on whether the probability meets or exceeds a threshold probability that the file includes malware.

At step 514, a user may be alerted of one or more files that are classified as malware. For example, as the machine learning model determines that files should be classified as malware, the files may be added to a list of malicious files to be examined by a system administrator or analyst. In some embodiments, the machine learning model may output a probability that the file is malware, and the probability may be incorporated in the list and used to sort the list. In some embodiments, a system administrator may examine the files that are classified as malware to determine if the files are indeed malware. If the files are malware, the files may be removed from the information handling system, and the information handling system may note that the classification was correct. If the files are not malware, the files may remain on the information handling system, and the information handling system may note that the classification was incorrect.

At step 516, the information handling system may, in some embodiments, quarantine files that are classified as malware. For example, the files may be quarantined and/or placed in an inaccessible storage location until an expert is able to examine the files and determine whether they are, indeed, malware.

Figure 6:
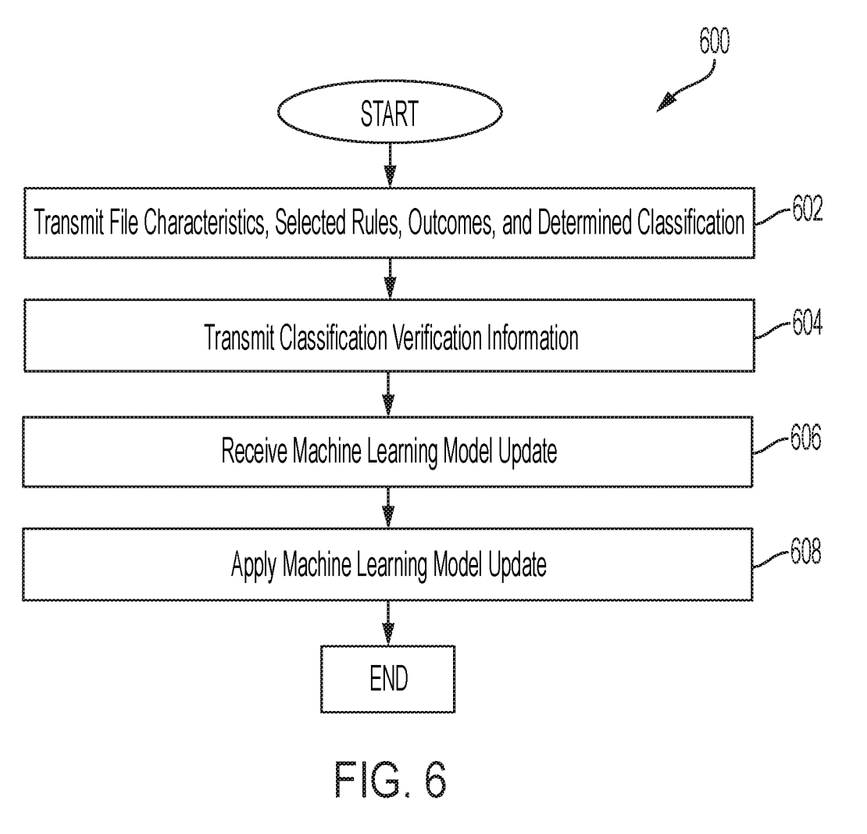
FIG. 6 is a block diagram of an example method for updating, by an information handling system, a machine learning model for malware detection according to some embodiments of the disclosure.

Data gathered during classification of files using the machine learning model may be used to train the machine learning model. For example, such data may be transmitted to a back-end information handling system and used, by the back end information handling system, to train the machine learning model. Updates to the machine learning model may then be generated and broadcast to client information handling systems based on the training. An example method 600 for updating a machine learning model on an information handling system is shown in FIG. 6. The method 600 may begin, at step 602 with transmission of file characteristics, selected rules, outcomes, and a determined classification of a file. For example, an information handling system executing a machine learning model to classify files may classify a file and transmit information regarding the file classification to a back-end information handling system. The transmitted information may include rules applied to a file, characteristics of the file, such as a file name and/or type, outcomes of the application of each rule to the file, such as whether an application of a rule indicated that the file should be classified as malware or not malware, the classification determined by the machine learning model, an amount of time lapsed during application of the rules to the file, and an amount of time lapsed during analysis of the rules, outcomes, and file metadata by the machine learning model.

In some embodiments, at step 604, the information handling system may transmit classification verification information to the back-end information handling system. The classification verification information may, for example, include a determination by an expert, system administrator, or other user whether a file classified as malware actually included malware. For example, the information handling system may alert the user of files classified as malware. The user may then examine the files and enter information regarding whether the classification of the file as malware was correct or incorrect. The information entered by the user may then be transmitted, by the information handling system, to the back end information handling system. The back-end information handling system may then use the received information to train the machine learning model and to generate an update to the machine learning model based on the new information.

At step 606, the information handling system may receive an update to the machine learning model. For example, the information handling system may receive an update to the machine learning model reflecting training performed on the machine learning model by the back-end information handling system. The updated machine learning model may classify files with greater accuracy or with greater speed than prior versions of the machine learning model. After receiving the update, the information handling system may, at step 608, apply the update to the machine learning model.

The updated machine learning model may then be used to classify files as malware or not malware.

Figure 7:
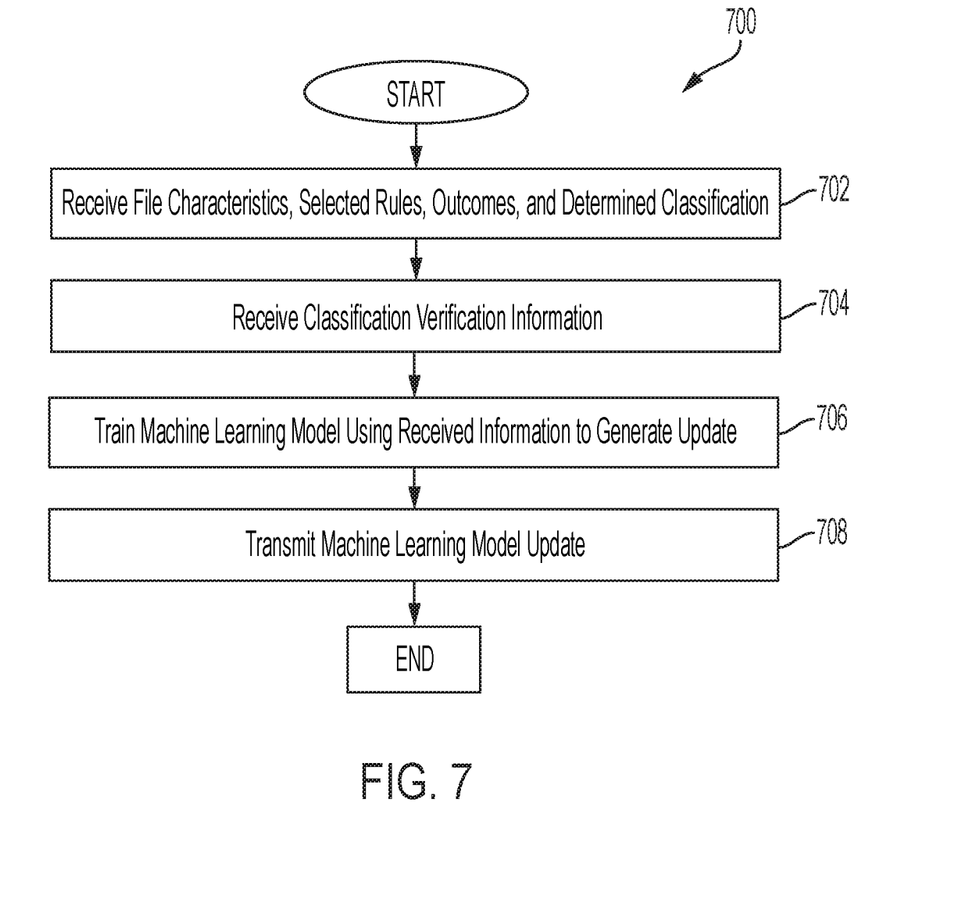
FIG. 7 is a block diagram of an example method for training a machine learning model for malware detection according to some embodiments of the disclosure.

A back-end information handling system may train and maintain a machine learning model applied by client information handling systems in classifying files as malware or not malware. An example method 700 for training a machine learning model is shown in FIG. 7. The method 700 may begin, at step 702 with receipt of file characteristics of a file, selected rules, outcomes of application of the selected rules to the file, and a determined classification of the file. For example, a back-end information handling system may receive such information from a client information handling system executing a machine learning model, as described with respect to FIGS. 5-6. The received information may include rules applied to a file, characteristics of the file, such as a file name and/or type, an outcome of the application of each rule to the file, such as whether the application of the rule indicates that the file should be classified as malware or not malware, the classification determined by the machine learning model, an amount of time lapsed during application of the rules to the file, and an amount of time lapsed during analysis of the rules, outcomes, and file metadata by the machine learning model. In some embodiments, the back-end information handling system may receive information related to multiple classified files from a network of information handling systems. The back-end information handling system may store the received information in a database. In some embodiments, at step 704, the back-end information handling system may receive classification verification information, as described with respect to step 604 of FIG. 6.

At step 706, the back-end information handling system may train the machine learning model using the received information. For example, the machine learning model may be trained using file data for multiple files, multiple rules applied to each file, an outcome for each application of each rule to each file, an overall classification as malware or not malware for each file, and classification verification information indicating whether each file classified as malware was, in fact, malware. For example, training the machine learning model based on a set of rules that were applied to a file that was then determined, and confirmed, to include malware may increase the likelihood that the model will classify similar files with similar rules and outcomes as malware in the future. The back-end information handling system may generate a machine learning model update based on the training of the machine learning model. At step 708, the back-end information handling system may transmit the machine learning model update to a client information handling system. In some embodiments, the back-end information handling system may broadcast machine learning model updates to a network of client information handling systems.

The flow chart diagrams of FIGS. 5-7 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for detecting malware m an information handling system, comprising:
   receiving, by an information handling system, a plurality of rules;
   receiving, by the information handling system, a file for malware testing;
   determining, by the information handling system, to apply two or more rules of the plurality of rules to the file based, at least in part, on one or more characteristics of the file, wherein the determining comprises using a classification model to estimate the probability that each rule in the plurality of rules would be able to detect malware in files having the one or more characteristics of the file;
applying the two or more rules of the plurality of rules to the received file to determine a plurality of outcomes; and
determining, by the information handling system, whether to classify the file as malware by inputting the plurality of outcomes for applying a machine learning model to the plurality of outcomes.

2. The method of claim 1, further comprising transmitting, by the information handling system, the determination of whether to classify the file as malware or not malware for training the machine learning model.

3. The method of claim 2, wherein the training is performed by a back-end information handling system, further comprising receiving, by the information handling system from the back-end information handling system, an update to the machine learning model based, at least in part, on the training.

4. The method of claim 1, wherein the one or more characteristics of the file comprise a file type.

5. The method of claim 1, wherein the two or more of the plurality of rules are further determined based, at least in part, on a comparison of the one or more characteristics of the file to a rule type for each of the rules in the plurality of rules.

6. The method of claim 1, wherein determining whether to classify the file as malware or not malware comprises determining to classify the file as malware, further comprising:
Classifying the file as malware;
quarantining the file.

7. An information handling system comprising:
a processor; and
a memory;
wherein the processor is configured to perform steps comprising
receiving a plurality of rules;
receiving a file for malware testing;
determining, by the information handling system, to apply two or more rules of the plurality of rules to the file based, at least in part, on one or more characteristics of the file, wherein the determining comprises using a classification model to estimate the probability that each rule in the plurality of rules would be able to detect malware in files having the one or more characteristics of the file;
applying the two or more rules of the plurality of rules to the received file to determine a plurality of outcomes; and
determining whether to classify the file as malware or not malware by inputting the plurality of outcomes for applying a machine learning model to the plurality of outcomes.

8. The information handling system of claim 7, wherein the processor is further configured to perform steps comprising receiving from a back end server an update to the machine learning model based, at least in part, on training of the machine learning model performed by the back-end information handling system using the determined classification of the file as malware or not malware.

9. The information handling system of claim 7, wherein the one or more characteristics of the file comprise a file type.

10. The information handling system of claim 7, wherein the two or more of the plurality of rules are further determined based, at least in part, on a comparison of the one or more characteristics of the file to a rule type for each of the rules in the plurality of rules.

11. An information handling system comprising:
a processor; and
a memory;
wherein the processor is configured to perform steps comprising:
receiving, from a client information handling system, information specifying a plurality of rules applied to a file by the information handling system, a plurality of outcomes of the application of the plurality of rules to the file, and a classification of the file determined by the client information handling system by inputting the plurality of outcomes for applying a machine learning model to the plurality of outcomes, wherein the plurality of rules applied to the file are determined using a classification model to estimate the probability that each rule in the plurality of rules would be able to detect malware in the file;
training the machine learning model based on the received information specifying the plurality of rules, the received plurality of outcomes, and the received classification of the file;
generating an update to the machine learning model based on the training; and
transmitting the update to the client information handling system.

12. The information handling system of claim 11, wherein the step of receiving further comprises receiving, from the client information handling system, one or more characteristics of the file, and wherein the machine learning model is further trained based on the received one or more characteristics of the file.

13. The information handling system of claim 11, wherein the step of receiving further comprises receiving, from the client information handling system, classification verification information specifying whether the classification was correct, and wherein the machine learning model is further trained based on the received classification verification information.

14. The information handling system of claim 13, wherein training the machine learning model comprises:
if the file is classified as malware and the verification information specifies that the classification was correct, increasing a probability that the model will classify a new file as malware if application of the same plurality of rules to the new file results in the same plurality of outcomes; and
if the file is classified as malware and the verification information specifies that the classification was incorrect, increasing a probability that the model will classify a new file as not malware if application of the same plurality of rules to the new file results in the same plurality of outcomes.

15. The information handling system of claim 11, wherein the processor is further configured to perform steps comprising:
storing the received information specifying the plurality of rules, the plurality of outcomes, and the classification in a database.

16. The information handling system of claim 11, wherein the processor is further configured to perform steps comprising:

transmitting the update to a network of multiple client information handling systems.

\* \* \* \* \*